United States Patent
Lee et al.

(10) Patent No.: US 8,348,679 B2
(45) Date of Patent: Jan. 8, 2013

(54) JUNCTION BOX FOR A VEHICLE

(75) Inventors: Joon Ho Lee, Kyeonggi-Do (KR); Jong Kyu Lee, Kyeonggi-Do (KR)

(73) Assignee: Tyco Electronics Amp Korea Ltd., Kyungsangbuk-Do (KR)

( * ) Notice: Subject to any disclaimer, the term of this patent is extended or adjusted under 35 U.S.C. 154(b) by 0 days.

(21) Appl. No.: 12/625,074

(22) Filed: Nov. 24, 2009

(65) Prior Publication Data

US 2010/0130033 A1    May 27, 2010

(30) Foreign Application Priority Data

Nov. 27, 2008 (KR) .................. 10-2008-0119210

(51) Int. Cl.
*H01R 12/00* (2006.01)
(52) U.S. Cl. ............................................ 439/76.2
(58) Field of Classification Search ............. 439/76.2, 439/949
See application file for complete search history.

(56) References Cited

U.S. PATENT DOCUMENTS

| | | | |
|---|---|---|---|
| 5,011,417 A | 4/1991 | Matsumoto | |
| 5,618,186 A | 4/1997 | Saka | |
| 5,877,944 A * | 3/1999 | Onizuka | 361/826 |
| 6,402,530 B1 | 6/2002 | Saito | |
| 6,514,091 B2 | 2/2003 | Saito | |
| 7,390,198 B2 | 6/2008 | Oka et al. | |
| 7,488,186 B1 * | 2/2009 | Hayakawa | 439/76.2 |
| 2003/0022535 A1 * | 1/2003 | Schoepf | 439/76.2 |
| 2003/0030996 A1 | 2/2003 | Shiina | |
| 2011/0117755 A1 | 5/2011 | De La Reza et al. | |
| 2011/0201216 A1 | 8/2011 | Miyamoto | |

FOREIGN PATENT DOCUMENTS

| | | |
|---|---|---|
| KR | 1020020007258 A | 1/2002 |
| KR | 1020020009545 A | 1/2002 |

OTHER PUBLICATIONS

European Search Report dated Feb. 23, 2010, of co-pending EP Application No. EP09177176, 2 pages.

* cited by examiner

*Primary Examiner* — Phuong Dinh
(74) *Attorney, Agent, or Firm* — Barley Snyder

(57) ABSTRACT

A junction box has a PCB, on which fuses, relays, and a control and communication unit are mounted. The PCB is provided with upper and lower surfaces, on which a first connector and a second connector are respectively positioned. Further, the junction box includes a cover covering the PCB in such a way as to expose the fuses, the first connector, and the second connector. Since the fuses, the relays, and the control and communication unit are mounted on a single board, the junction box reduces manufacturing costs of the board, reduces size and weight of the board, and effectively performs communication with external electronic modules.

16 Claims, 6 Drawing Sheets

JUNCTION BOX FOR A VEHICLE

CROSS-REFERENCE TO RELATED APPLICATIONS

This application claims the benefit of the filing date under 35 U.S.C. §119(a)-(d) of Korean Patent Application No. 10-2008-0119210 of Nov. 27, 2008

FIELD OF THE INVENTION

The invention relates to a junction box, and more particularly to a junction box for vehicles in which connectors are disposed on both surfaces of one board.

BACKGROUND

In general, vehicles have many electronic parts, and new electronic techniques are constantly being developed and applied to these vehicles, contributing to more electronic parts that only function when power is supplied to that electronic part. Accordingly, many wires are required to supply power to these electronic parts.

Conventionally, a fuse box was used to protect a large number of wires, where the wires, in the fuse box, were closely disposed to supply power to respective electronic parts. However, the fuse box caused many problems caused by assembly errors during the assembly process, as well as a compact disposition of terminals. In order to make up for problems, a junction box has been manufactured, where the wires in the fuse box are replaced with a printed circuit board and metal layers.

Further, electronic systems are becoming increasingly complicated since the number of functions has increased, as well as the number of electric modules in vehicles. Therefore, the junction box must serve as an electronic module having control and communication functions in addition to the existing power distribution function.

Hereinafter, conventional junction boxes will be described with reference to the annexed drawings.

FIGS. 1 and 2 are views illustrating conventional junction boxes.

As shown in FIG. 1, a conventional junction box includes a main board 10, on which fuses and relays are mounted. Further, a daughter board 20 is provided, which performs a control function. As such, the junction box is manufactured by connecting the two boards 10 and 20. Here, the daughter board 20 is mounted on the upper surface of the main board 10, as shown in FIG. 1, and connection between the two boards 10 and 20 is accomplished by using electrical connectors (not shown).

Further, the two boards 10, 20 of the junction box may be independently manufactured. That is, as shown in FIG. 2, another conventional junction box includes a first board 30, on which fuses and relays are mounted, and a second board 40 which performs a control function. Here, connection between the first board 30 and the second board 40 is accomplished by jumper pins (not shown).

In order to add control function with the power distribution function through the fuses and relays, the above conventional junction boxes respectively require additional boards, as shown in FIGS. 1 and 2. However, it is difficult to accommodate electronic parts that perform a control function within a board having limited size. Additionally, when the two boards are used, manufacturing costs of the junction boxes is increased. Size and weight of the junction boxes are increased as well, thus generating increase in the overall volume and weight of a vehicle. Further, installation of connectors to connect the junction boxes to external terminals is hampered by many restrictions.

SUMMARY

Therefore, the present invention has been made in view of the above problems, and it is an object of the present invention to provide a junction box that reduces manufacturing costs of the board, has reduced size and weight, and effectively performs electrical connection with the outside.

In accordance with the present invention, the above and other objects are accomplished by the provision of a junction box having a PCB provided with upper and lower surfaces. Fuses, relays, and a control and communication unit are mounted on the PCB, while a first connector is located on an upper surface of the PCB and a second connector is located on a lower surface of the PCB. The junction box further includes a cover that covers the PCB, the cover configured in such a way to expose the fuses, the first connector, and the second connector.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EMBODIMENT(S)

Figure 1:
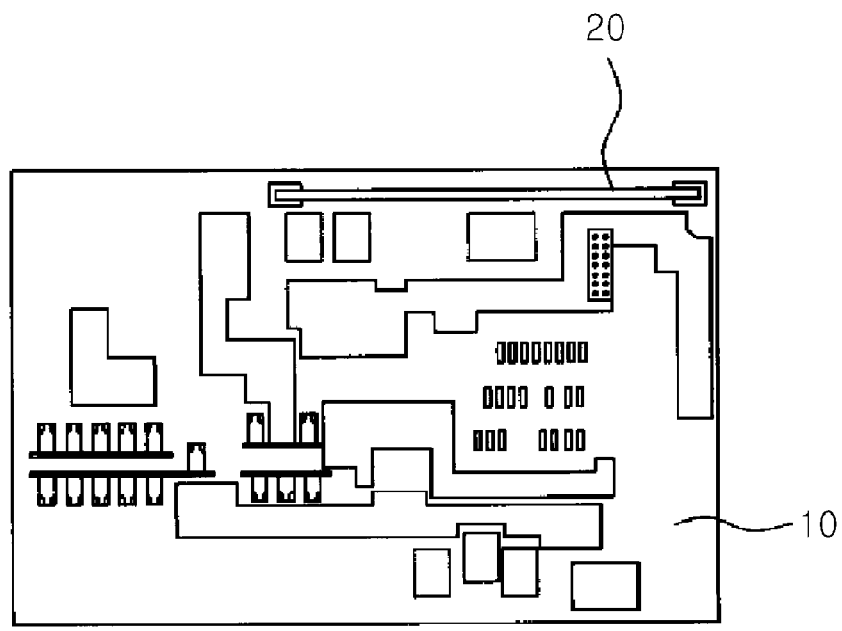
FIG. 1 is a top view of a known junction box.
Figure 1:
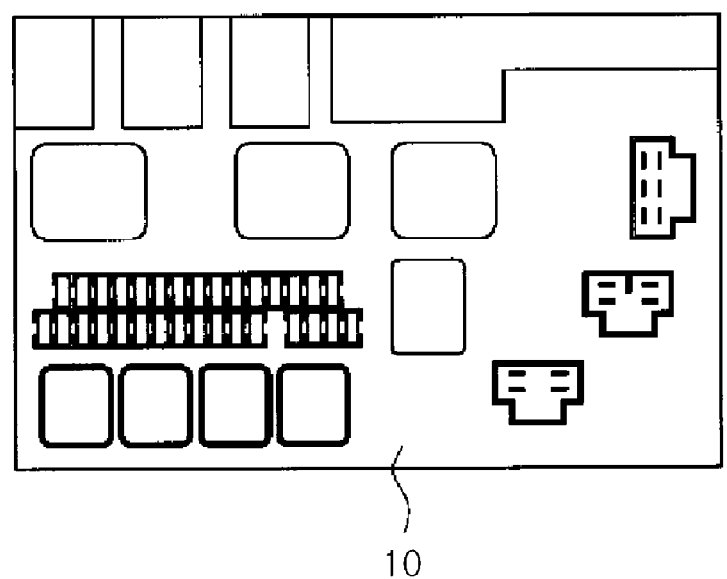
Figure 2:
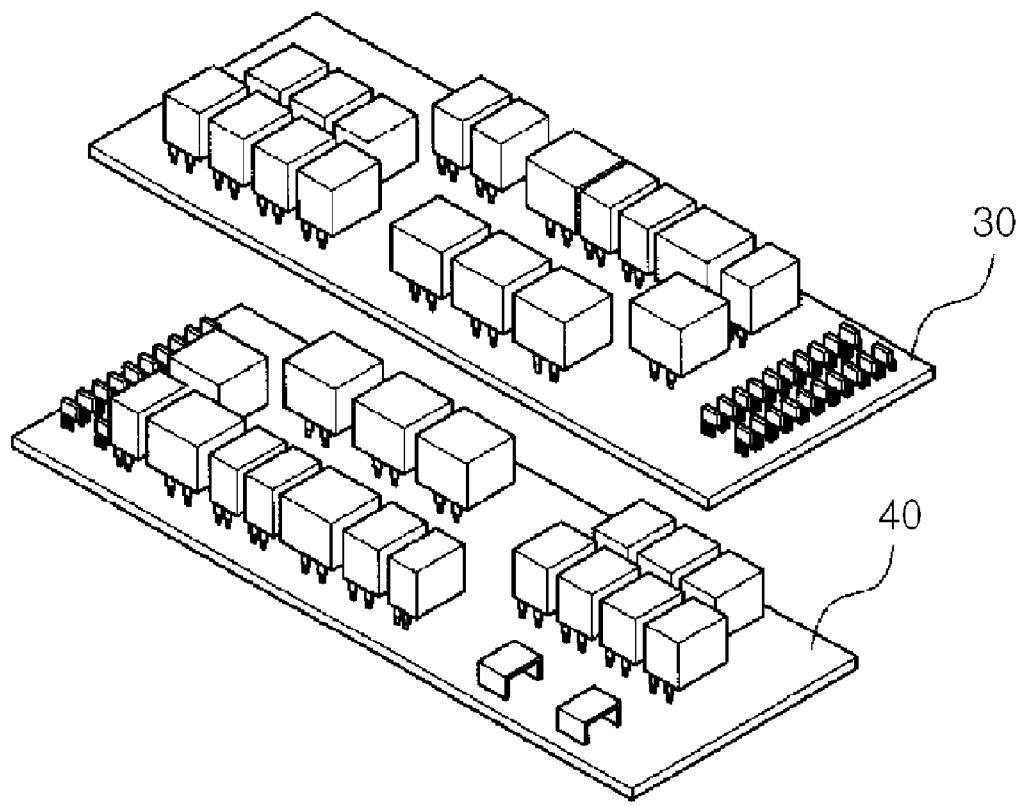
FIG. 2 is a perspective view of a known junction box.

Hereinafter, embodiments of the present invention will be described in detail with reference to the annexed drawings.

As shown in FIGS. 3-6, a junction box, according to the present invention, includes a printed circuit board (PCB) 100 having upper and lower surfaces, on which fuses 110, relays 120, a control and communication unit 130, and connectors 140 and 150 are mounted. The junction box further includes an upper cover 200, which covers the upper surface of the PCB 100, and exposes the fuses 110 and a first connector 140. A lower cover 300 is also provided to cover the lower surface of the PCB 100 and expose a second connector 150. Additionally, a shielding part 400 is provided to shield a region of the lower cover 300 exposing the second connector 150 (see FIG. 6).

As described above, the above junction box includes the PCB 100 and the cover units to cover the PCB 100. Further, the PCB 100 of the junction box is electrically connected to external electronic modules by the first and second connectors 140 and 150 (see FIG. 6). Moreover, the PCB 100 of the junction box receives power supplied from the outside, and then distributes the power.

Figure 6:
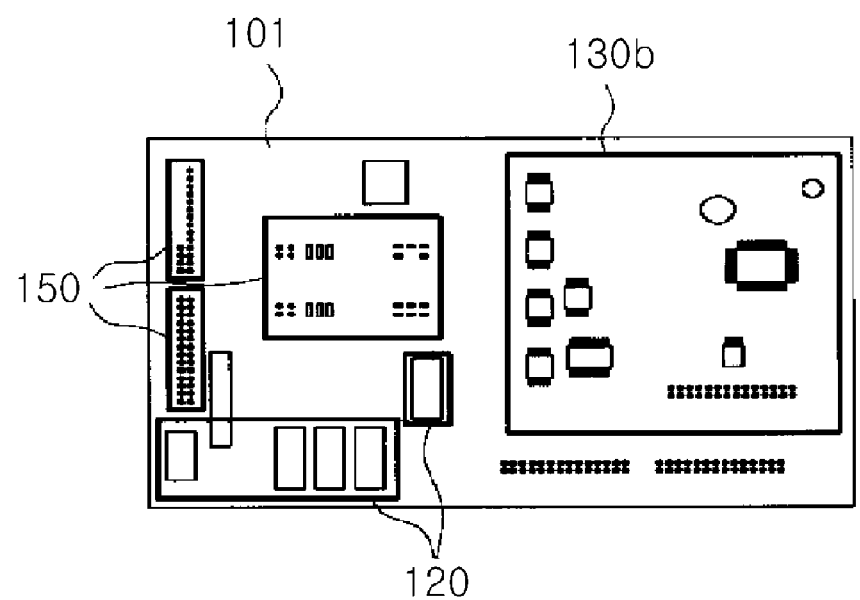
FIG. 6 is a rear view of the printed circuit board (PCB) according to the invention.

Here, the junction box is characterized in that the connectors 140 and 150 are disposed on the upper and lower surfaces of one board (i.e., a PCB) and the fuses 110, the relays 120, and the control and communication unit 130 are effectively disposed, and thus eliminates use of any additional boards (see FIG. 6). Further, the fuses 110 are disposed on the upper surface of the PCB 100, and thus A/S on the fuses 110 is freely performed.

According to the invention, the PCB 100 is covered with the upper cover 200 and the lower cover 300, and thus is protected from external impact.

Figure 3:
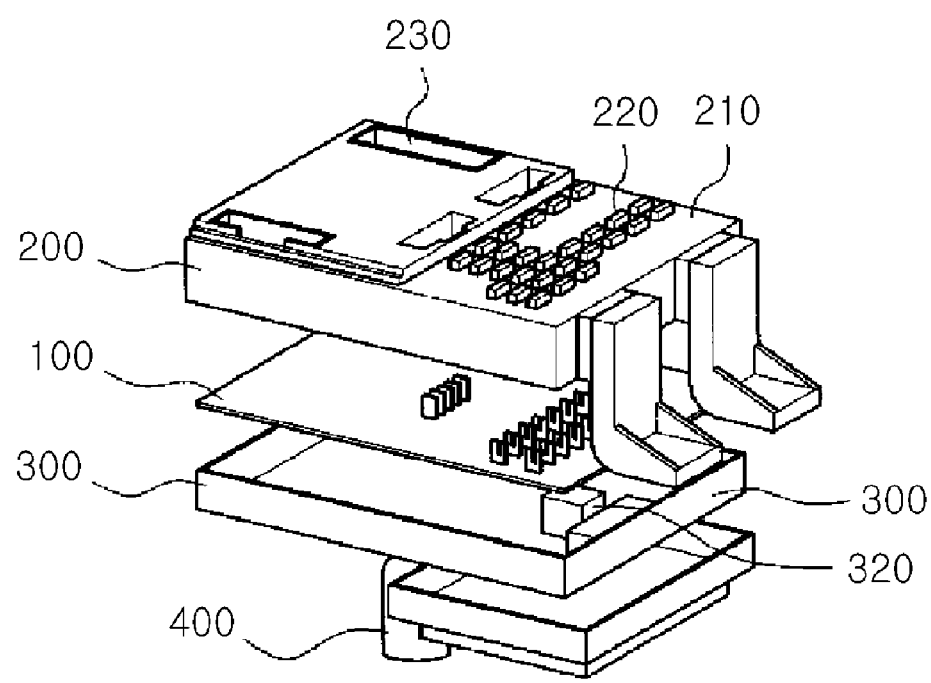
FIG. 3 is an exploded perspective view of a junction box according to the invention.
Figure 4:
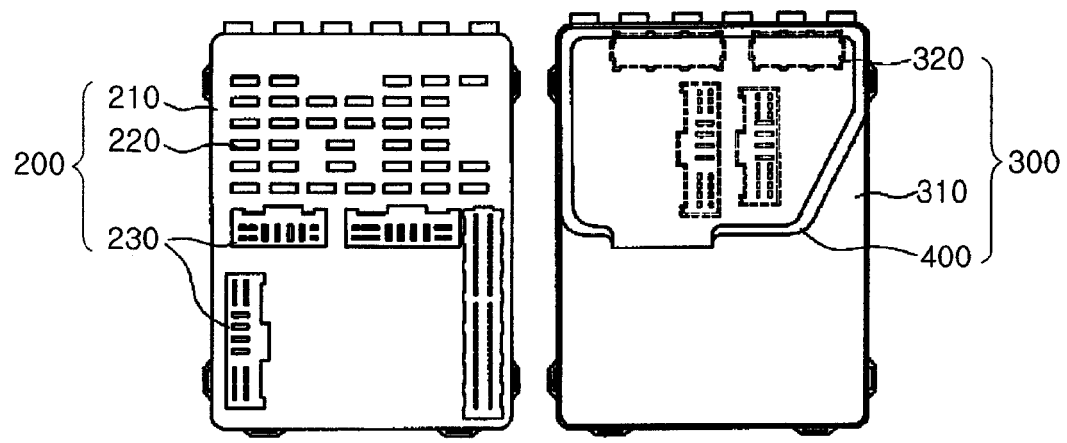
FIG. 4 is a top and bottom view of a front and rear surfaces of the junction box according to the invention.

As shown in FIGS. 3 and 4, the upper cover 200 includes an upper cover body 210. Fuse exposing grooves 220 and first connector exposing grooves 230 are provided on the upper cover body 210. The fuse exposing grooves 220 is designed such that a plurality of the fuses 110, mounted on the upper surface of the PCB 100, are exposed.

In the embodiment shown, the upper cover body 210 is formed in the shape of a rectangular box having an opened lower portion. The upper cover body 210 is made of an insulating material, such as plastic or rubber, and thus protects the PCB 100 from external physical and electrical impacts.

Further, the fuse exposing grooves 220 are provided on the upper cover body 210. Here, the fuse exposing grooves 220 are formed at positions corresponding to the plurality of the fuses 110. The fuses 110 on the PCB 100 are exposed to the outside of the upper cover body 210 through the fuse exposing grooves 220. Thereby, the fuses 110 may be easily replaced with new ones. Further, the fuses 110 may be partially exposed to the outside of the upper cover body 210 through the fuse exposing grooves 220. Although the upper cover body 210 is not separated from the PCB 100, it is possible to check, from the outside, whether or not the fuses 110 are damaged. Of course, the fuse exposing grooves 220 may be omitted in alternate embodiments, as occasion demands.

The first connector exposing grooves 230 is further designed to expose the first connector 140, which is mounted on the upper surface of the PCB 100. Connector jacks (or sockets) electrically connected with the first connector 140 are inserted into the first connector exposing grooves 230. The first connector 140 is electrically connected to the outside through the connector jacks inserted into the first connector exposing grooves 230. Here, the entire region or only pin regions of the first connector 140 may be exposed through the first connector exposing grooves 230.

The lower cover 300 corresponding to the above-described the upper cover 200 includes a lower cover body 310 and second connector exposing grooves 320. Preferably, the lower cover body 310 is made of the same material as the upper cover body 210. A receiving space is formed by connecting the upper cover body 210 and the lower cover body 310, and the PCB 100 is located within the receiving space. The second connector exposing grooves 320, used to expose the second connector 150 mounted on the lower surface of the PCB 100, are provided on the lower cover body 310. Connector jacks, electrically connected with the second connector 150, are inserted into the second connector exposing grooves 320. The second connector 150 is electrically connected to the outside through the connector jacks. In the same manner as the first connector exposing grooves 230, the entire region or only the pin regions of the second connector 150 may be exposed through the second connector exposing grooves 320.

The shielding part 400 shields the second connector exposing grooves 320, and is mounted on the lower cover 300 at the second connector exposing grooves 320. The shielding part 400 is formed in the shape of a hollow box having an opened upper portion. A cable box, through which cables pass, and a groove are formed on the upper surface of the shielding part 400. Since the shielding part 400 shields the second connector exposing grooves 320 of the lower cover 300, the shielding part 400 prevents the second connector exposing grooves 320 from being exposed directly to the outside. Further, the shielding part 400 prevents the second connector 150 from being contaminated, and prevents external connection jacks (or plus or sockets) from being easily separated from the second connector 150 of the PCB 100.

The fuses 110, the relays 120, and the control and communication unit 130 are integrally mounted on the PCB 100 (see FIGS. 5 and 6), which is surrounded by the upper cover 200 and the lower cover 300, thereby reducing size of the junction box as well as reducing manufacturing costs of the junction box. Further, the first connector 140 and the second connector 150 are provided on the upper surface and the lower surface of the PCB 100, thereby facilitating electrical connection with the outside (see FIGS. 5 and 6).

Hereinafter, the PCB 100, in accordance with the present invention, will be described in detail with reference to FIGS. 5 and 6.

Figure 5:
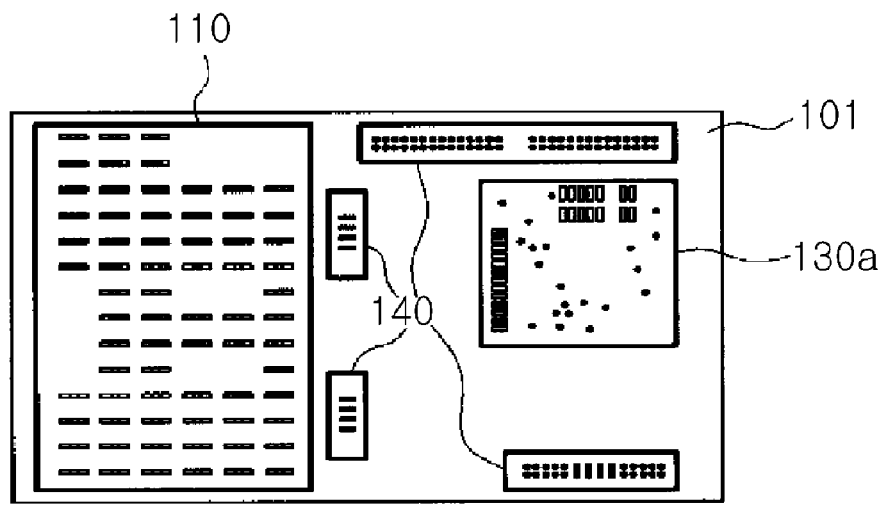
FIG. 5 is a front view of a printed circuit board (PCB) according to the invention.

As shown in FIGS. 5 and 6, the PCB 100 in accordance with the present invention includes a printed circuit board (PCB) board 101. The PCB board 100 has a plurality of the fuses 110 mounted on the upper surface of the PCB board 101, and a plurality of the relays 120 mounted on the lower surface of the PCB board 101. The control and communication unit 130 (130a and 130b) is provided on the upper and lower surfaces of the PCB board 101, while the first connector 140 is provided on the upper surface of the PCB board 101 and the second connector 150 is provided on the lower surface of the PCB board 101.

As described above, the junction box, according to the invention, includes elements having a power distribution function as well as elements having control and communication functions, both elements being integrated onto one board, thereby reducing manufacturing costs and the number of parts and having reduced size and weight.

A multilayer board having wire patterns formed on the inside and outer surface thereof is used as the PCB board 101.

As shown in FIG. 5, the plural fuses 110 are mounted on the upper surface of the PCB board 101 at one side. In the embodiment shown, 2-terminal fuses are used as the fuses 110. However, the size and standard of the fuses 110 are not limited, and various fuses to distribute power of a vehicle may be used as the fuses 100. Therefore, a mounted part, on which the fuses 110 are mounted, is provided on the PCB board 101. In the embodiment shown, the fuses 110 are concentrated upon one side (the left side of FIG. 5) of the center of the PCB board 101. Thereby, other parts may be mounted at the other side (the right side of FIG. 5). That is, the fuses 110 are disposed at the left side of the center of the PCB board 101, and the first connector 140 and a first control and communication unit 130a are disposed at the right side of the center of the PCB board 101. Here, the center of the PCB board 101 refers to the central line of the PCB board 101.

As described above, the fuses 110 are mounted on the upper surface of the PCB board 101, and thus A/S on the fuses 110 may be easily performed.

Further, the plural relays 120 are mounted on the lower surface of the PCB board 101. Here, the relays 120 may be mounted on the upper surface of the PCB board 101. Further, size and standard of the relays 120 are not limited, and various kinds of relay may be used as the relays 120, as occasion demands.

The junction box in accordance with the present invention includes the control and communication unit 130 having a control function and a communication function of electronic modules.

Preferably, the control and communication unit 130 is divided into first and second control and communication units 130a and 130b, which are respectively mounted on the upper and lower surfaces of the PCB board 101. If parts (i.e., chips or circuit elements) forming the control and communication unit 130 are provided on one surface of the PCB board 101, then the parts may occupy the entire surface of one side. Therefore, respective elements of the control and communication unit 130 are divided into two units. That is, as shown in FIGS. 5 and 6, the first control and communication unit 130a is mounted on the upper surface of the PCB board 101, and the second control and communication unit 130b is mounted on the lower surface of the PCB board 101. Thereby, only a part of each of the upper and lower surfaces of the PCB board 101 is used to mount the control and communication unit 130, and thus the control and communication unit 130 does not have to occupy the entire surface of one side of the PCB board 101. Further, the first control and communication unit 130a is mounted on the upper surface of the PCB board 101 at a region where the fuses 110 are not mounted, thereby being capable of suppressing interference of the first control and communication unit 130a with the fuses 110. The second control and communication unit 130b is mounted on the lower surface of the PCB board 101 at a region corresponding to the first control and communication unit 130a, thereby being capable of facilitating electrical connection between the first control and communication unit 130a and the second control and communication unit 130b. The second control and communication unit 130b may be mounted on the lower surface of the PCB board 101 at a region corresponding to the fuses 110, thereby being capable of suppressing interference of the second control and communication unit 130b with the fuses 110.

The first and second connectors 140 and 150 are used to provide power or an electrical signal to the fuses 110. The first and second connectors 140, 150, the relays 120, and the control and communication unit 130 are mounted on the PCB board 101.

The first connector 140 is formed on the upper surface of the PCB board 101 at a region where the fuses 110 and the first control and communication unit 130a are not mounted, and the first connector 140 includes four connectors, as shown in FIG. 5. Further, the second connector 150 is formed on the lower surface of the PCB board 101 at a region where the second control and communication unit 130b and the relays 120 are not mounted. Two connectors of the first connector 140 are located at the central region of the PCB board 101, and the remaining two connectors are located at the edge of the PCB board 101. That is, the four connectors are disposed in a C shape.

The second connector 150 includes three connectors, as shown in FIG. 6. Each of the respective connectors is provided with a pin projecting to the outside of the PCB board 101. These connector pins are electrically connected to the fuses 110, the relays 120, and the control and communication unit 130 through wires within the PCB board 101. Two connectors of the second connector 150 are located at the edge of the PCB board 101, and the remaining one connector is located at the central region of the PCB board 101. That is, the three connectors are positioned in the a T shape.

As described above, the junction box according to the invention includes the first and second connectors 140 and 150, which are respectively positioned on the upper and lower surfaces of the PCB board 101, thereby facilitating electrical connection with electronic modules of a vehicle and the fuses 110, the relays 120, and the control and communication unit 130 of the junction box. This is achieved by adjusting positioning the fuses 110, the relays 120, and the control and communication unit 130 on the PCB board 101, as shown in FIGS. 5 and 6.

As apparent from the above description, the present invention provides a junction box, in which fuses 110, relays 120, and a control and communication unit 130 are mounted on a single board 101, thereby reducing manufacturing costs of the board 101, reducing size and weight of the board 101, and effectively performing communication with external electronic modules.

Although embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A junction box comprising:
    a printed circuit board (PCB) provided with upper and lower surfaces;
    fuses, relays, and a control and communication unit mounted on the PCB, the control and communication unit being divided into a first control and communication unit mounted on the upper surface and a second control and communication unit mounted on the lower surface;
    a first connector located on an upper surface of the PCB;
    a second connector located on a lower surface of the PCB; and
    a cover covering the PCB, the cover configured to expose the fuses, the first connector, and the second connector.

2. The junction box according to claim 1, wherein the cover further comprises an upper cover covering the upper surface of the PCB.

3. The junction box according to claim 2, wherein the upper cover is configured to expose the fuses and the first connector.

4. The junction box according to claim 1, wherein the cover further comprises a lower cover covering the lower surface of the PCB.

5. The junction box according to claim 4, wherein the lower cover is configured to expose the second connector.

6. The junction box according to claim 4, further comprising a shielding part to shield a region of the lower cover.

7. The junction box according to claim 6, wherein the shielding part is configured to expose the second connector.

8. The junction box according to claim 3, further comprising:
    fuse exposing grooves on the upper cover to expose the fuses; and
    first connector exposing grooves on the upper cover to expose the first connector.

9. The junction box according to claim 5, further comprising:
    second connector exposing grooves on the lower cover to expose the second connector.

10. The junction box according to claim 1, wherein the fuses and the first connector are mounted on an upper surface of the PCB, the relays and the second connector are mounted on a lower surface of the PCB.

11. A junction box comprising:
    a printed circuit board (PCB) provided with upper and lower surfaces;
    fuses, relays, and a control and communication unit mounted on the PCB, the fuses being mounted on the upper surface of the PCB, the relays being mounted on the lower surface of the PCB, and the control and communication unit being divided into a first control and communication unit mounted on the upper surface and a second control and communication unit mounted on the lower surface;

a first connector located on an upper surface of the PCB;

a second connector located on a lower surface of the PCB, and having second connector exposing grooves extending from the lower surface;

an upper cover covering the upper surface of the PCB, the upper cover configured to expose the fuses, and the first connector; and a lower cover covering the lower surface of the PCB and exposing the second connector.

12. The junction box according to claim 11, further comprising a shielding part to shield a region of the lower cover.

13. The junction box according to claim 12, wherein the shielding part is configured to expose the second connector.

14. The junction box according to claim 11, further comprising fuse exposing grooves on the upper cover.

15. The junction box according to claim 11, further comprising first connector exposing grooves on the upper cover.

16. The junction box according to claim 15, further comprising second connector exposing grooves on the lower cover.

* * * * *